United States Patent [19]

Kunzler et al.

[11] Patent Number: 4,555,372
[45] Date of Patent: Nov. 26, 1985

[54] ROTATIONAL MOLDING OF CONTACT LENSES

[75] Inventors: Wilhelm F. Kunzler, Fairport, N.Y.; William F. Coombs, Punta Gorda, Fla.

[73] Assignee: Bausch & Lomb Incorporated, Rochester, N.Y.

[21] Appl. No.: 481,600

[22] Filed: Apr. 4, 1983

Related U.S. Application Data

[63] Continuation-in-part of Ser. No. 246,826, Mar. 21, 1981.

[51] Int. Cl.[4] .............................................. B29D 11/00
[52] U.S. Cl. ........................................ 264/2.1; 264/2.7
[58] Field of Search ................... 264/1.1, 2.1, 2.6, 2.7; 351/160 H, 160 R, 161, 174; 425/808

[56] References Cited

U.S. PATENT DOCUMENTS

| | | | |
|---|---|---|---|
| 3,211,810 | 10/1965 | Gamber | 351/160 |
| 3,361,858 | 1/1968 | Wichterle | 264/2.2 |
| 3,408,429 | 10/1968 | Wichterle | |
| 3,496,254 | 2/1970 | Wichterle | |
| 3,660,545 | 5/1972 | Wichterle | |
| 3,699,089 | 10/1972 | Wichterle | 264/2.1 |
| 4,197,266 | 4/1980 | Clark et al. | |
| 4,202,848 | 5/1980 | Neefe | |
| 4,324,461 | 4/1982 | Salvatori | 351/161 |

FOREIGN PATENT DOCUMENTS

| | | | |
|---|---|---|---|
| 295538 | 12/1966 | Australia | |
| 2033101 | 5/1980 | United Kingdom | 351/161 |
| 2041557 | 9/1980 | United Kingdom | 351/161 |

OTHER PUBLICATIONS

"A New Corneal Lens Design for the Correction of Residual Astigmatism", Braff, *Optometric Weekly*, vol. 61, No. 1, Jan. 1, 1970, pp. 24 & 25.

*Primary Examiner*—James Lowe
*Attorney, Agent, or Firm*—Gregory E. Croft; Bernard D. Bogdon

[57] ABSTRACT

A toric or bifocal contact lens comprising a central optic zone and a peripheral zone, said peripheral zone having affixed to its anterior surface a bead, said bead on at least a part of the upper half of said peripheral zone being tapered down from a sweeping arc which intersects with the bead on each side of the lens to the uppermost point on the periphery of the lens. The lens can be prepared by casting in a mold to obtain the desired anterior surface of the lens followed by lathe cutting the posterior surface.

2 Claims, 5 Drawing Figures

ROTATIONAL MOLDING OF CONTACT LENSES

BACKGROUND

1. Field of the Invention

This invention relates to rotationally stabilized contact lenses.

2. Prior Art Statement

A. Lens Product

The Barron contact lens patents (U.S. Pat. Nos. 3,698,802 and 4,084,890) disclose the use of contact lenses with a thickened peripheral region to prevent shifting or rotation of the lens used as astigmatism lenses. These patents also teach that when it is found that the upper lid of a user of lens exerts an extraordinary force against the lens, which force would tend to shift the lens, additional adherence can be created by adding weight to the lens at the 6 o'clock position thereof. These lenses have an increased thickness of material which is generally semi-ring-shaped as viewed in plan and wedge-shaped in cross-section.

Fanti, U.S. Pat. No. 4,095,878 and The Optician, No. 169, beginning at page 8 (April 4, 1975), disclose flattening the lens along a portion of its peripheral region to stabilize a soft contact lens, which may be symmetrical or asymmetrical to its axis of rotation, in a predetermined orientation. This orientation is necessary if astigmatism, heterophorias or squinting are to be corrected. The lens may have a complimentary flattened area on the opposite periphery. The lens has a flattened region on the outer surface along at least one portion of its periphery, extending substantially in parallel to the central axis of the lens. That is, the lens has a minimum thickness at the position 12 o'clock and increases in the direction of 9 o'clock and 3 o'clock, the points of maximum thickness should be at 9 o'clock and 3 o'clock. No carrier for the lens is disclosed.

Strachan et al, Canada No. 1,004,889, disclose the stabilization of contact lenses where at least one surface of the lens is toric by the adding of any one of, or a combination of, single truncation, double truncation and prism ballast features to the lens. The truncation can be either horizontal or vertical, with the vertical truncation being preferred when the lens is thicker.

Brummel et al, U.S. Pat. No. 4,211,476, disclose contact lenses with angular orientation and stabilization by locating between the prescription zone of the lens and the periphery of the lens means for forming a control meniscus with the tear layer of the eye so that the resultant vector of the fluid forces created by the means falls within an arcuate area defined by the gravity vector passing through the geometrical center of the lens and 15° on either side of the vector. The control meniscus forming means can be a hold with countersinks on the anterior and posterior surfaces of the lens.

U.K. patent application No. 2,031,178A discloses rotational stabilization of a soft contact lens having a central optic zone and a peripheral zone, characterized in that the peripheral zone comprises (a) a sink segment formed by a depression in the anterior face, the sink segment being defined by a line joining two points on the circumference of the peripheral zone, and (b) a secondary segment diametrically opposite the sink segment, a secondary segment having a lower mass than the sink segment. The secondary segment can be an area of the face of the peripheral zone directly opposite the sink segment which has been mechanically cut away by eccentricity establishing a secondary arc which defines with the circumference a secondary segment of reduced weight and thickness. The sink segment can be defined by a visible cord instead of an arc.

VanderKolk et al, European patent application No. 0008,726, disclose stabilizing toric contact lenses. A high minus powered anterior surface toric lens is made having a toric central optical portion without prism and an annular outer portion having prism but without toric effect, the outer portion being truncated in a lower part so that there is upward movement of the center of rotation of the blank and of the center of gravity in a manner such that the center of gravity is in use below the center of rotation, thus assisting if the lens is rotated by lid or eye movement the lens tends to rotate back into correct orientation.

Other patents illustrative of prior art means for stabilization of contact lenses include U.S. Pat. Nos. 3,102,157; 3,211,810; 3,246,841; 3,431,327; 3,933,411 and 4,071,293.

B. Processes

Neefe, U.S. Pat. No. 4,202,848, discloses a method of making bifocal contact lenses by molding the plastic lens to form its concave surface, mounting the combined lens and mold on an off-center lathe to produce a prism lens, removing the lens from the lathe, turning the lens 180°, replacing the lens on the off-center lathe and cutting the near power segment.

Wichterle, U.S. Pat. Nos. 3,408,429, 3,496,254 and 3,660,545 disclose the spincasting process for preparing contact lenses. The polymerizing mixture is contained in a rotating open mold having a concave surface. The anterior, convex surface of the lens, is thus formed by the mold surface, and the posterior, concave surface of the lens, is formed as the result of centrifical forces, surface tension of the polymerizing mixture and other factors such as the size and shape of the mold, the volume of the polymerizing mixture, the condition of the mold's surface, etc. The concave surface of the lens thus formed is approximately parabolic in shape and many factors must be carefully controlled to produce reproducable shapes. Lenses produced by the spincasting usually require postpolymerization edge finishing.

Clark et al, U.S. Pat. No. 4,197,266, disclose apparatus for and method of forming ophthalmic lenses including contact lenses. In operation the plastic lens material maintained in a flowable state is transferred from the reservoir to the mold cavity where it is formed into a permanent shape. Thereafter selected portions of the cast lens are removed as necessary or expedient.

Wichterle, Australia No. 295,538, discloses a method of making hydrogel copolymer contact lenses consisting of copolymerizing a solvent-free monomer mixture capable of forming three dimensional hydrophilic copolymers in a rotating mold, working the hard, non-swelled lens thus obtained, if necessary, washing it and then swelling the product to obtain the final lens. The method allows also to provide special shapes to compensate astigmatic deviation of the eye. Mechanical working of the lens is made possible by the fact that the copolymer containing no appreciable amount of a swelling liquid is comparatively hard and can be easily cut and polished.

Other patents illustrative of prior art procedures and equipment for manufacture of toric contact lenses include U.S. Pat. Nos. 3,079,737; 3,344,692; 3,482,906; 3,535,825; 3,623,800 and 3,950,082.

SUMMARY OF THE INVENTION

In accordance with this invention, there is provided a contact lens comprising a central optic zone and a peripheral zone, said peripheral zone having affixed to its anterior surface a bead, said bead on at least a part of the upper half of said peripheral zone being tapered down (preferably uniformly so) from a sweeping arc which intersects with the bead on each side of the lens to the uppermost point on the periphery of the lens. The lens can be made by casting in a mold to obtain the desired anterior surface of the lens followed by lathe cutting the posterior surface.

DESCRIPTION OF THE PREFERRED EMBODIMENT

Figure 1:
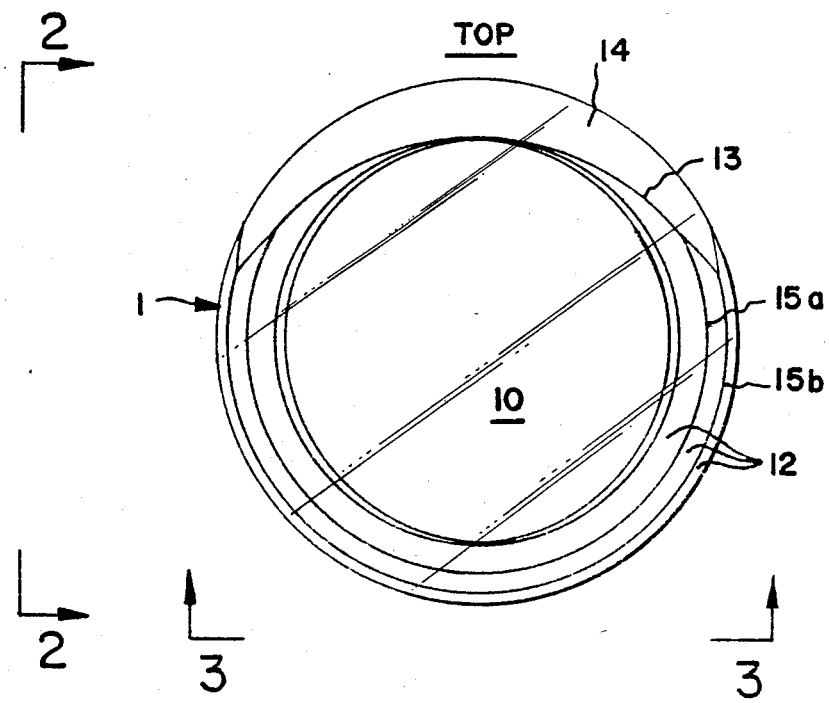
FIG. 1 is a plan view of the lens of this invention.

The contact lens 1 shown in FIG. 1 is provided with a tapered region 14 on its upper bead area 12 which lies between the lens periphery and the secondary arc 13 which passes through bead 12.

Figure 2:
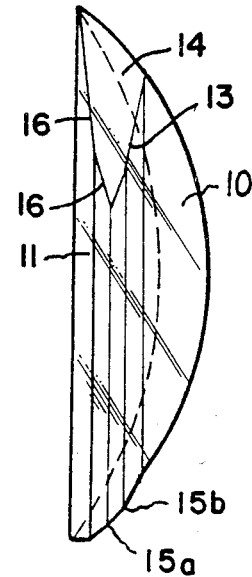
FIG. 2 is a vertical side view of the lens of FIG. 1.

In FIG. 2 the tapered region 14 of contact lens 1 is shown in side view which better illustrates tapered region 14 and its boundaries; namely, secondary arc 13 and junction line 16 formed by the joining of the surfaces of the bead 12 and the tapered region 14 or the carrier 11 and the tapered region 14. The crest of bead 15a, 15b can be alternatively one surface, however, generally greater eye comfort is obtained by use of two surfaces as shown. The crest of the bead can also be modified to provide a continuously bending surface rather than a distinct crest 15a, 15b.

From FIG. 1 and FIG. 2, it will be seen that the maximum amount of tapered region 14 is obtained by passing the secondary arc 13 through bead 12 so that secondary arc 13 is adjacent to, but does not pass through, optic zone 10. A lesser amount of position stabilization is obtained when the secondary arc 13 is moved toward the periphery.

Contact lens 1 is fabricated by molding or spin-casting the anterior surface and then cutting the posterior of the lens by methods well known in the art. The contact lens 1 is provided with a toric surface on the anterior of the optic zone 10.

Figure 3:
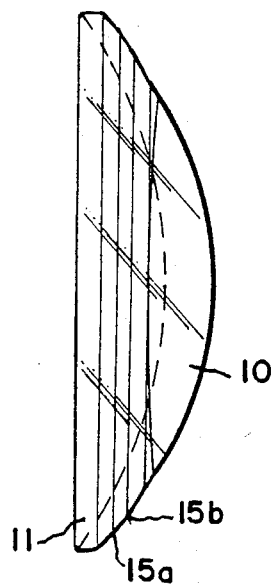
FIG. 3 is a horizontal side view from the bottom of lens of FIG. 1.

The dotted line in FIG. 2 and FIG. 3 shows the posterior surface of the lens.

The diameter of the contact lens 1 is generally of a size dependent on the size of the cornea. This diameter must be large enough to make sure the optic zone 10 is larger than the pupil of the eye.

When contact lens 1 is placed on the cornea, it will be rotated due to the pressure exerted by the eyelids until the tapered region 14 is typically aligned in a 12 o'clock (at the top) orientation as shown in FIG. 1. This dynamic stabilization causes the lens to orient itself on the cornea and tends to align the tapered region 14 in the 12 o'clock-6 o'clock orientation.

The correct orientation of a contact lens according to the present invention depends on the blinking motion of the eyelids.

The contact lens 1 can be of either of the hard or soft types and fabricated from any of the materials known for this purpose, as for instance, siloxane, hydrophilic material or polymethacrylate. The terms hard and soft are used in the usual sense of the contact lens fitting practice.

While the invention has been described in terms of orientation of contact lenses with toric optic surfaces, the invention is also applicable to bifocal contact lenses and to combinations of toric and bifocal corrective contact lenses.

Figure 4:
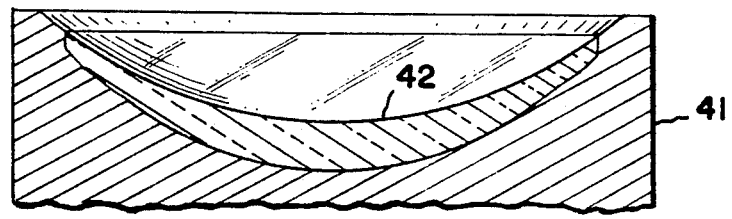
FIG. 4 is a cutaway side view of a spincast mold containing the polymerized lens product of this invention.
Figure 5:
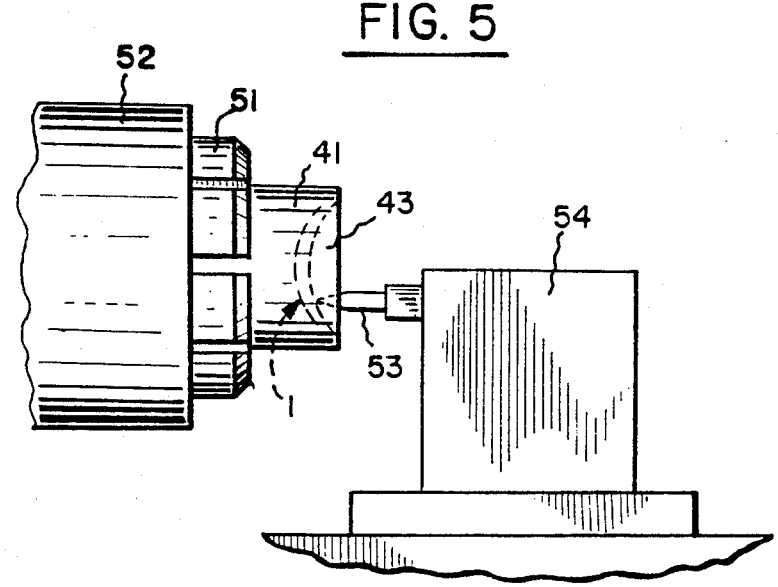
FIG. 5 illustrates cutting the posterior surface of the lens of this invention.

It was discovered that when the lens 1 of this invention was prepared by the spincast process, FIG. 4, e.g., as described in the previously discussed Wichterle patents, the lens, when placed on the cornea surface, did not move into a stable position on the cornea. This lack of position stability is objectionable for health care reasons. It was found that this objectionable feature could be overcome by filling mold 41 with a greater amount of monomer mixture 42 than cutomarily used in preparing a lens 1 of stated size and power by the spincast process. Then monomer mixture 42 is polymerized in the usual fashion, e.g., curing induced by ultraviolet energy in the absence of oxygen or thermal curing. Alternatively, the monomer mixture 42 is charged to a mold 41 and then cured as before without mold 41 being rotated. Thus the monomer mixture can be cured under either spincast or static-cast conditions. The mold can be made of any conventional mold material, such as thermoplastics, glass or metal, e.g. brass. It is advantageous to use a master die to produce or form the negative mold surface. Thereafter, the excess thickness 43 is removed from the posterior of the lens by lathe cutting as shown in FIG. 5 to obtain the desired lens 1. In operation mold 41 is secured in chuck 51 of lathe 52. The cutting tool 53 on tool support 54 is moved to the polymerized monomer mixture 42 and then cuts away the excess thickness 43. This type of lathe cutting is described in U.S. Pat. Nos. 4,084,459 (Clark) and 4,197,266 (Clark et al).

The process of this invention offers several important advantages over conventional prior art methods. In addition to the economic advantage of lower costs, the process offers better control of the lens produced, and a method of preparing lens configurations which are not readily possible with lathing methods. In this invention only the more easily prepared posterior (or concave) lens surface, usually requiring one or two curves, is cut on a lathe.

Lens 1, when prepared by a combination of spin-casting and subsequent lathe cutting, has the desired movement properties.

Thus, from the foregoing description, the invention can be most generically described as a contact lens for non-rotational orientation in the eye of a wearer, comprising a substantially circular lenticular carrier having a central concentric optical portion surrounded by a generally annular non-visual portion, and said non-visual portion having a thicker part at the lower part of said lenticular carrier when in the eye of a wearer and having a thinnner part at the upper part of said lenticular carrier when in the eye of a wearer, there being no additional prism in the optical lens area.

The embodiments of the invention in which an exclusive property or privilege is claimed are defined as follows:

1. In a casting process for preparing contact lenses, the improvement which comprises
   (a) charging to the mold having the negative surface of the desire anterior lens surface an excess of monomer solution,
   (b) spincast curing the monomer solution to obtain a lens which is thicker than desired, and
   (c) lathe cutting only the posterior of said lens to obtain the desired thickness.

2. The casting process of claim 1 where in step (a) the mold has the negative surface of an anterior lens surface comprising a central optic zone and a peripheral zone, said peripheral zone having affixed to its anterior surface a bead, said bead on at least a part of the upper half of said peripheral zone being tapered down from a sweeping arc which intersects with the bead on each side of the lens to the uppermost point on the periphery of the lens.

* * * * *